(12) United States Patent
Tamura

(10) Patent No.: US 7,486,633 B2
(45) Date of Patent: Feb. 3, 2009

(54) NETWORK SYSTEM, RADIO COMMUNICATION DEVICE, RADIO COMMUNICATION METHOD, AND COMPUTER PROGRAM FOR THE SAME

(75) Inventor: Yosuke Tamura, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 11/290,266

(22) Filed: Nov. 30, 2005

(65) Prior Publication Data

US 2006/0176842 A1    Aug. 10, 2006

(30) Foreign Application Priority Data

Dec. 2, 2004    (JP)    ............................ P2004-350335

(51) Int. Cl.
| | |
|---|---|
| H04B 7/14 | (2006.01) |
| H04Q 7/24 | (2006.01) |
| H04Q 7/20 | (2006.01) |
| H04L 12/18 | (2006.01) |
| H04M 11/04 | (2006.01) |

(52) U.S. Cl. ...................... 370/315; 370/338; 370/401; 455/404.2; 455/456.2

(58) Field of Classification Search ................ 370/315, 370/338, 401, 254, 400, 452, 351, 408, 503, 370/258; 455/128, 402, 404, 456.2; 709/224; 702/214, 183, 155, 150

See application file for complete search history.

(56) References Cited

U.S. PATENT DOCUMENTS 7,349,360 B2 *  3/2008  Gutierrez et al. ............ 370/315

2004/0190476 A1 *  9/2004  Bansal et al. ............... 370/338

FOREIGN PATENT DOCUMENTS

| JP | 2000-315974 | 11/2000 |
|---|---|---|
| JP | 2003-4497 | 1/2003 |

(Continued)

OTHER PUBLICATIONS

"The Coverage Problem in a Wireless Sensor Network", C. -F. Huang and Y. -C. Tseng (In Second Workshop on Sensor Networks and Applications (WSNA), Sep. 2003), pp. 115-121.

(Continued)

*Primary Examiner*—Charles N Appiah
*Assistant Examiner*—Kiet Doan
(74) *Attorney, Agent, or Firm*—Bell, Boyd & Lloyd LLP

(57) ABSTRACT

A network system, radio communication device, radio communication method, and computer program for same are provided. The present invention enables formation of a network topology with sensor nodes each having a traveling function and operating in the self-directive and dispersive state without using positional information. Each sensor nodes periodically transmits a HELLO message to neighboring nodes to exchange information therewith. In an area where the node density is high, the nodes are set in the Expand state and in the Bridge state. A node in the Expand state shifts to the Stay state when the node can be connected to only one neighboring node to becomes a component of the topology. A node in the Bridge state shifts to the Stay state together with neighboring nodes each having hidden terminals not less than a prespecified number to become a component of the topology.

25 Claims, 14 Drawing Sheets

FOREIGN PATENT DOCUMENTS

| | | |
|---|---|---|
| JP | 2004-032062 | 1/2004 |
| JP | 2004-165964 | 6/2004 |
| JP | 2004-260526 | 9/2004 |

OTHER PUBLICATIONS

"Unreliable Sensor Grids: Coverage, Connectivity and Diameter", Shakkottari S, R. Srikant, and N. Shroff (In Proceesings of the IEEE Infocom, Mar. 2003).

"Integrated Coverage and Connectivity Configuration in Wireless Sensor Networks", X. Wang, G. Xing, Z. Zhang, C. Lu, R. Pless, and C. Gill (In Proceedings of the ACM Symposium on Networked Embedded Systems (SenSys, 03), Nov. 2003)), pp. 28-39.

"Radar: An In-Building RF-Based User Location and Tracking System", P. Bahl and V. Padmanabhan (In Proceedings of the IEEE Infocom, Mar. 2000)).

* cited by examiner

FIG.3

- NODE ID
- STATE  EXPAND / BRIDGE / STAY)
- NEIGHBORING NODE IDS

FIG. 11
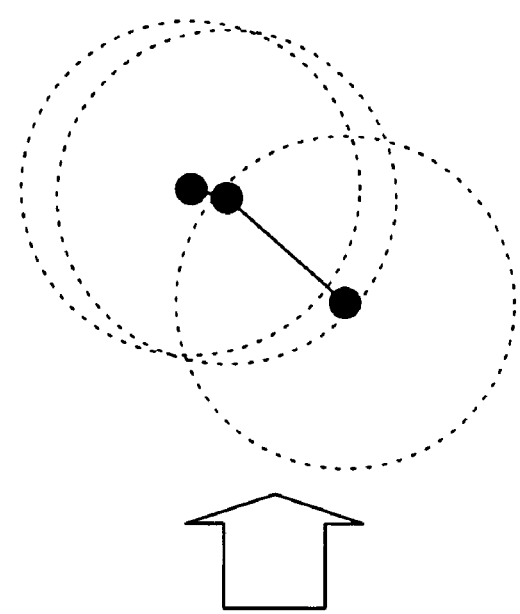
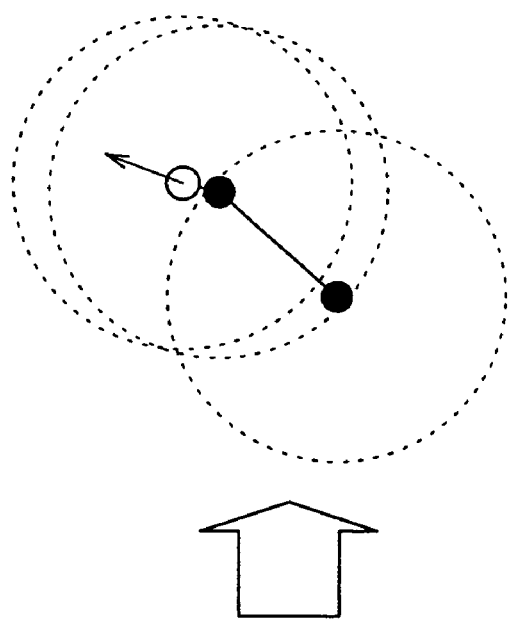
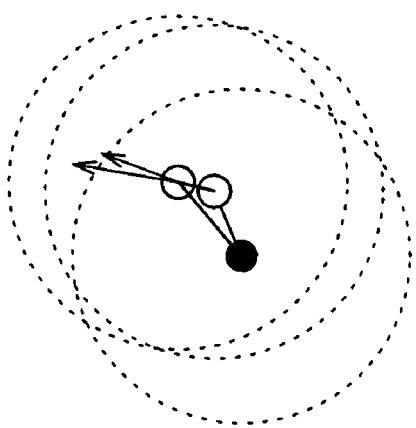
○ : NODE IN EXPAND STATE
● : NODE IN STAY STATE

NETWORK SYSTEM, RADIO COMMUNICATION DEVICE, RADIO COMMUNICATION METHOD, AND COMPUTER PROGRAM FOR THE SAME

CROSS REFERENCES TO RELATED APPLICATIONS

The present application claims priority to Japanese Patent Application 2004-350335 filed with the Japanese Patent Office on Dec. 2, 2004, the entire contents of which is being incorporated herein by reference.

BACKGROUND

The present invention relates to a network system, a radio communication device, and a radio communication method for acquiring and distributing information concerning the real world as well as to a computer program for the same. More specifically this invention relates to a network system, a radio communication device, and a radio communication method for collecting, on a network including a number of sensor nodes each having a sensor, a processing function, and a radio communication function distributed in a relatively wide area, data acquired by each sensor.

More particularly the present invention relates to a network system in which a plurality of sensor nodes each having a traveling function forms an ad-hoc network topology by operating in the self-directive and dispersive state, a radio communication device, a radio communication method, and a computer program for the same, and more specifically to a network system in which a plurality of sensor nodes each having a traveling function forms an ad-hoc network topology by operating in the self-directive state and dispersive state without using positional information, a radio communication device, a radio communication method, and a computer program for the same.

A network is formed by connecting a plurality of communication terminals via a communication line. For instance, on a computer network formed by connecting computers to each other, utilization of informational resources such as shared use, distribution, and distribution of information. Recently in association with technological development in the Internet or broad band networks, convenience in use of information and communication systems has substantially been improved. Further with distribution of mobile communication devices capable of being connected to the Internet such as a PDA (Personal Digital Assistance) or a mobile telephone, the ubiquitous network or ubiquitous computing capable of being used anywhere and allowing for access from a global space attracts social attentions.

It is generally said, on the other hand, that there are still several unsolved problems in relation to acquisition or distribution of information concerning the real world such as acquisition of information concerning an environment dynamically changing from time to time or simultaneous acquisition of information in a wide area. To solve the problems, there are active research activities for development of the "sensor network" for dealing with various types of information concerning the real world.

The sensor network is built by distributing a number of sensor nodes each having a sensor, a processing function and a radio communication function in a relatively wide area in the dispersive state. With the sensor network built as described above, data acquired by each sensor can be collected. Each of the sensor nodes operates basically in the self-directive and dispersive state, and therefore the sensor network is an ad-hoc communication system. Information acquired by one node is transferred, for instance, by means of the multi-hop transfer to a remote node. Therefore, if a network topology can be formed so that a larger communication area is provided by the same number of nodes, it would be efficient.

Further, because the sensor node has the traveling function, the plurality of sensor nodes form a network topology in the self-directive and dispersive state, which enables provision of sensing information to users. For instance, in the COTS-BOTS (Refer to, for instance, http://www-bsac.eecs.berkeley.edu/projects/cotsbots) developed in University of California at Barkley, a sensor node is built in the state where the sensor node is integrated with a wheel-type of robot.

As described above, if a network topology can be formed so that a larger communication area is provided by the same number of nodes, it would be efficient. Therefore, in the sensor network system in which a plurality of nodes each having the traveling function operate in the self-directive state, it is important to provide the technique for forming a dynamic network topology.

For building a sensor network, initial setting is generally performed according to the following procedure:
(1) installation of nodes
(2) time synchronization among nodes
(3) position measurement for each node A key point in the procedure is that position measurement is performed after sensor nodes are installed.

In the field of ubiquitous computing, the technique for position measurement requiring a specific infrastructure is available, and this technique is referred to as the "Range Based" technique. In contrast, the technique for position measurement used in the sensor network is different from the above and is referred to as the "Range Free" technique.

In the range-free position measurement technique, based on the assumption that some sensor nodes identify positional information thereof function as land marks respectively, each node measures a distance from each of the land marks. For instance, a node functioning as a land mark incorporates therein a positioning device such as a GPS (Global Positioning System). Other nodes can compute positions thereof by computing a distance to the land mark by using the number of hops or amplitude of electric wave to obtain more precise positional data. It is to be remarked that completion of installation of nodes is a presupposition of execution of position measurement.

In the sensor network system, if a network topology can be formed so that a larger communication area is provided by the same number of nodes, it would be efficient. The term of "topology" as used herein indicates the state where all nodes can be connected to each other by means of the communication procedure such as multi-hopping. Namely the topology indicates the single connected network.

The method of forming a network topology insuring connectivity between sensor nodes is largely classified to the static topology forming method based on the preposition that each sensor node does not travel, and to the dynamic topology forming method based on traveling of each sensor node having a traveling function.

The static topology forming method includes a method in which sensor nodes are scattered at a high density, a method in which sensor nodes are manually installed, and the like.

For instance, when position measurement is performed in an area not allowing for easy access by a man such as a mountain or a wood, sensors are scattered in the object field (for instance, several tens of thousands of inexpensive and minute sensor nodes are scattered from a flying airplane), and each of the sensors are used as a node for a network to treat sensing data (Refer to FIG. 14). Sensing data detected by each discrete node is extracted via an ad-hoc network formed by the nodes by means of the multi-hop transfer.

As one of the most sophisticated sensor networks belonging to the type as described above, the University of California at Berkley has proposed the "SmartDust" (Refer to, for instance, http://www-bsac.eecs.berkley.edu/~warneke/SmartDust/index.html). In the research and development trend which started from the "SmartDust" project, most of the research projects for the sensor network currently being conducted assume an environment in which a density of sensor nodes is high. In an environment in which nodes are sufficiently close to each other, it is not necessary to take into considerations the connectivity between the nodes.

However, most of applications for sensor networks actually used are not as described above, and a density of nodes is rather low in the networks. In addition, various restrictions are conceivable when it is actually tried to scatter sensor nodes at a high density in the real society. For instance, it is impossible to scatter sensor nodes from a flying airplane in an area where there are many buildings and residences close to each other. Further even if it is tried to scatter a number of sensor nodes, it is impossible to scatter the sensor nodes manually.

In most of sensor networks currently used for monitoring environmental conditions, sensor nodes are installed manually. In this case, it is required to provide each sensor node checking the connectivity, so that the work load is very large. This method may be best suited when there are only several nodes, but in a case where there are several hundreds, several thousands sensor nodes or more in all, it is impossible to manually install the sensor nodes. It is not realistic to select an area not allowing for easy access by men as a target field. Further to improve the efficiency of a topology, it is required to install sensor nodes grasping the topological feature of the field as a whole, and this is also difficult.

There have been filed several patent applications relating to a sensor network or a sensor collection system in which a topology is formed statically (Refer to, for instance, Japanese Patent Laid-open No. 2004-260526 and Japanese Patent Laid-open No. 2003-4497).

On the other hand, attentions to a method for dynamically forming a network topology using nodes each having a traveling means are still not so high in the field of network designing, but there are several examples of research and development activities in the field of robotics.

In most of the techniques for dynamically forming a network topology, generally it is assumed that a radio wave area is sufficiently larger as compared to the sensing area, so that the most important desire in the techniques is optimization of the sensing area. The connectivity is the so-called life line for a traveling node in remote operations, and therefore it is required to form a topology taking into consideration not only the sensing area but also the connection area. For instance, in sensing environmental information or the like, sometimes it is required to acquire samples in a certain area providing credible data in place of performing sampling in the entire area.

Further there is a study as to which node is to be activated in a sensor network with the high density in consideration to the connectivity and the sensing area (Refer to, for instance: "The Coverage Problem in a Wireless Sensor Network", C. -F. Huang and Y. -C. Tseng (In Second Workshop on Sensor Networks and Applications (WSNA), September 2003) "Unreliable Sensor Grids: Coverage, Connectivity and Diameter", Shakkottari S, R. Srikant, and N. Shroff (In Proceesings of the IEEE Infocom, March 2003) "Integrated Coverage and Connectivity Configuration in Wireless Sensor Networks", X. Wang, G. Xing, Z. Zhang, C. Lu, R. Pless, and C. Gill (In Proceedings of the ACM Symposium on Networked Embedded Systems (SenSys, 03), November 2003)).

In the techniques, it is assumed that each node previously identifies positional information thereof. As described above, most of the position measurement techniques are based on the premise that the techniques are used in the state where a topology has been established, so that compatibility of the techniques with the established topologies is rather poor. Further with the technique based on the premise that positional information is available, it is extremely difficult to generate a topology ensuring the connectivity. For, in the actual society, an expensive system such as the GPS is required for acquiring positional information with high precision. Further there are many objects interfering radio wave, and further such a system assumes an idealistic environment in a two-dimensional space, so that formation of a topology in a three-dimensional space is further difficult.

In other words, in the sensor network system in which a topology is formed statically, there is the problem relating to installation of sensor nodes. On the other hand, in a case where a topology is formed dynamically, it is possible to overcome the problem relating to installation of sensor nodes because each of the sensor nodes used in the system has a traveling function, but there is still a program in a process of position measurement. It is desired that each sensor node has a device for acquiring positional information such as a GPS, but in that case the cost for the system is very high. For the reasons described above, we consider that the method, in which a network topology is dynamically formed without requiring each sensor node having the traveling function to have any positional information, is more preferable.

SUMMARY

An advantage of the present invention is desired to provide an excellent network system, a radio communication device, and a radio communication method capable of advantageously collecting data acquired by each sensor on a network including sensors and sensor nodes each having the processing function and radio communication function provided in the dispersed state in a relatively wide area as well as for a computer program for the same.

Another advantage of the present invention is desired to provide an excellent network system, a radio communication device and a radio communication method capable of dynamically and advantageously forming an ad-hoc network topology with a plurality of sensor nodes each having the traveling function and operating in the self-directive and dispersed state as well as a computer program for the same.

Another advantage of the present invention is desired to provide an excellent network system, a radio communication device, and a radio communication method capable of forming a network topology with a plurality of sensor nodes each having the traveling function without using positional information as well as a computer program for the same.

Another advantage of the present invention is desired to provide an excellent network system, a radio communication device, and a radio communication method capable of efficiently forming a network topology to provide a larger communication area with a plurality of sensor nodes each having the traveling function and operating in the self-directive and dispersed state as well as a computer program for the same.

The present invention was made to achieve the advantages described above, and provides in a first embodiment thereof a network system in which a network topology is formed with a plurality of nodes each having a radio communication function and a traveling function and operating in the self-directive and dispersed state, and in this network system, each node has a first state and a second state in which the node searches for positional information relating to neighboring nodes traveling with the traveling function, and a third state in which traveling with the traveling function is disabled. The first state shifts to the third state when a first condition is satisfied, and the second state shifts to the third state when a second condition different from the first condition is satisfied. In the network system, each node shifts to the third state dynamically switching between the first state and the second state to form a network topology.

The term of "system" as used herein indicates a matter in which a plurality of devices (or function modules each realizing a specific function) are logically collected regardless of whether the functions or function modules are provided within a single housing or not (and this definition of the "system" is applicable in the following descriptions).

In the first state in the present invention is the Expand state in which each node travels and searches for a position where the node can acquire connectivity with neighboring nodes to expand the network topology. A node in the Expand state shifts to the Stay state when the node can be connected to one neighboring node in the Stay state.

The second state is the Bridge state in which each node travels and searches for a position allowing for connection with neighboring nodes to connect independent network topologies. A node in the Bridge state shifts to the Stay state when the node can be connected to two or more nodes which are not neighboring to each other and do not have any common neighboring node.

The third state is the Stay state in which each node stops at the current position to finally become a component of the network topology.

When a network topology is initialized, all nodes are in the Expand state. When the node density is over a prespecified value, nodes in the Bridge state are generated with the prespecified probability.

Nodes in the Bridge state can start formation of a topology, but when there are a plurality of nodes in the Bridge state at remote sites, there is the possibility that disconnected networks are finally formed. To overcome this problem, the probability of connection of all nodes to one network can be raised by introducing a mechanism to generate nodes in the Bridge node in an area where the node density is relatively high.

State shift between the Expand state and the Bridge state is performed reversibly. Namely each node dynamically switches the function thereof between expansion of a topology and connection between topologies. Each of the nodes in these states travels from place to place by means of the random walk and searches for the state where all nodes are connected to each other by means of the communication procedure such as multi-hopping, namely a position adapted for formation of a single connected network, and finally enters the Stay state.

At present, there have been developed sensor network systems for connecting various types of information concerning the real world. A sensor network is built by installing a number of sensor nodes each having the sensor, processing function and radio communication function.

As methods each for forming a topology in a sensor network, there are the static method and also the dynamic method in which the traveling function of each node is utilized. In the method for dynamically forming a topology, it is possible to solve the problem relating to installation of sensor nodes, but there is a problem still unsolved in a process for position measurement.

In contrast, in the sensor network system according to the present invention, each sensor node not utilizing positional information travels and exchanges information with neighboring nodes within a coverage of electric wave to dynamically switch a function thereof between expansion of the topology and connection of the topology. In other words, the topology expands by itself according to self-directive travel of each sensor node having the traveling function, and therefore a network travel can dynamically be built without requiring use of positional information.

A node in each state is required to recognize connectivity with neighboring nodes during a process of forming a network topology. Therefore, each node may transmit a first signal including a list of nodes neighboring to the node, namely a HELLO message at a prespecified interval. In this case, each node can recognize neighboring connectable nodes by receiving the HELLO message from the neighboring nodes or detect the node density.

As described above, the sensor network system according to the present invention tries to maximize the network topology keeping the connectivity between sensor nodes. However, sometimes performance degradation may occur in the basic mechanism for forming a network topology such as the situation disadvantageous and not efficient from the view point of maximization of a topology area in which two units of nodes in the Expand state shift to the Stay state according to electric wave with strong amplitude or the situation not advantageous for connectivity in which nodes shift to the Stay state because amplitude of electric wave is weak.

To solve the two problems as described above, in the present invention, amplitude of electric wave is employed for improvement. Namely each node can obtain connectivity with neighboring nodes from which electric wave with proper amplitude is received by the radio communication unit. More specifically each node can not obtain connectivity with neighboring node from which electric wave with amplitude higher or lower than a prespecified amplitude is received.

The present invention provides, in a second embodiment thereof, a computer program described in a computer-readable form so that a radio communication device having a sensor, a radio communication function, and a traveling function can operate as a sensor node on a sensor network, and this program includes the steps of dynamically switching between a first state and a second state in each of which a sensor node searches for data for connection with neighboring nodes traveling with the traveling function and based on data for connection with neighboring nodes acquired by the radio communication function; shifting from the first state to a third state in which travel with the traveling function is inhibited when a first condition is satisfied; and shifting from the second state to the third state when a second condition different from the first condition is satisfied.

The computer program in the second embodiment of the present invention is described in a computer-readable form so that prespecified processing can be realized on a computer system. In other words, a cooperative function is realized on a computer system by installing the computer program in the second embodiment of the present invention on the computer system, and then the radio communication device operates as a sensor node constituting the sensor network. By activating a plurality of sensor nodes as described above to build a radio network, the same effects as those provided by the sensor network system in the first embodiment of the present invention can be achieved.

With the present invention, it is possible to provide an excellent network system, a radio communication device, and a radio communication method capable of advantageously collecting data acquired by each sensor on a network built by providing a number of sensor nodes each having a sensor, a processing function, and a radio communication function in the scattered state in a relatively wide area as well as a computer program for the same.

Further with the present invention, it is possible to provide an excellent network system, a radio communication device and a radio communication method capable of advantageously forming an ad-hoc network topology with a number of sensor nodes each having a traveling function and operating in the self-directive and dispersive state as well as a computer program for the same.

With the present invention, it is possible to provide an excellent network system, a radio communication device and a radio communication method capable of forming a network topology with sensor nodes each having a traveling function and operating in the self-directive and dispersive state without using positional information as well as a computer program for the same.

With the present invention, it is possible to provide an excellent network system, a radio communication device and a radio communication method capable of efficiently forming a network topology to expand a communication area with a plurality of sensor nodes each having a traveling function and operating in the self-directive and dispersive state as well as a computer program for the same.

The sensor network system according to the present invention is formed with a plurality of sensor nodes each having a traveling function, and each sensor node not utilizing positional information travels and exchanges information with neighboring nodes within a coverage of electric wave because it would be more efficient if it is possible to form a network topology so that a larger communication area is provided with the same number of nodes, and dynamically switches a function thereof between expansion of the topology and connection of local topologies. With this feature the network topology expands in association with self-directive travel of sensor nodes each having a traveling function.

Additional features and advantages are described herein, and will be apparent from, the following Detailed Description and the figures.

BRIEF DESCRIPTION OF THE FIGURES

FIG. 3 is a view showing an example of configuration of a HELLO message.

FIG. 11 is a view for illustrating the situation in which a performance for expanding a topology has been degraded in a basic mechanism of a network topology.

DETAILED DESCRIPTION

An embodiment of the present invention is described in detail hereinafter with reference to the drawings.

The present invention relates to a sensor network system built on a network system by distributing a number of sensor nodes having a sensor nodes each having a sensor, a processing function, and a radio communication function in a relatively wide area for collection of data acquired by each sensor, and more specifically to a method of dynamically forming a network topology with a plurality of sensor nodes each having a traveling function without the need for using positional information.

Figure 1:
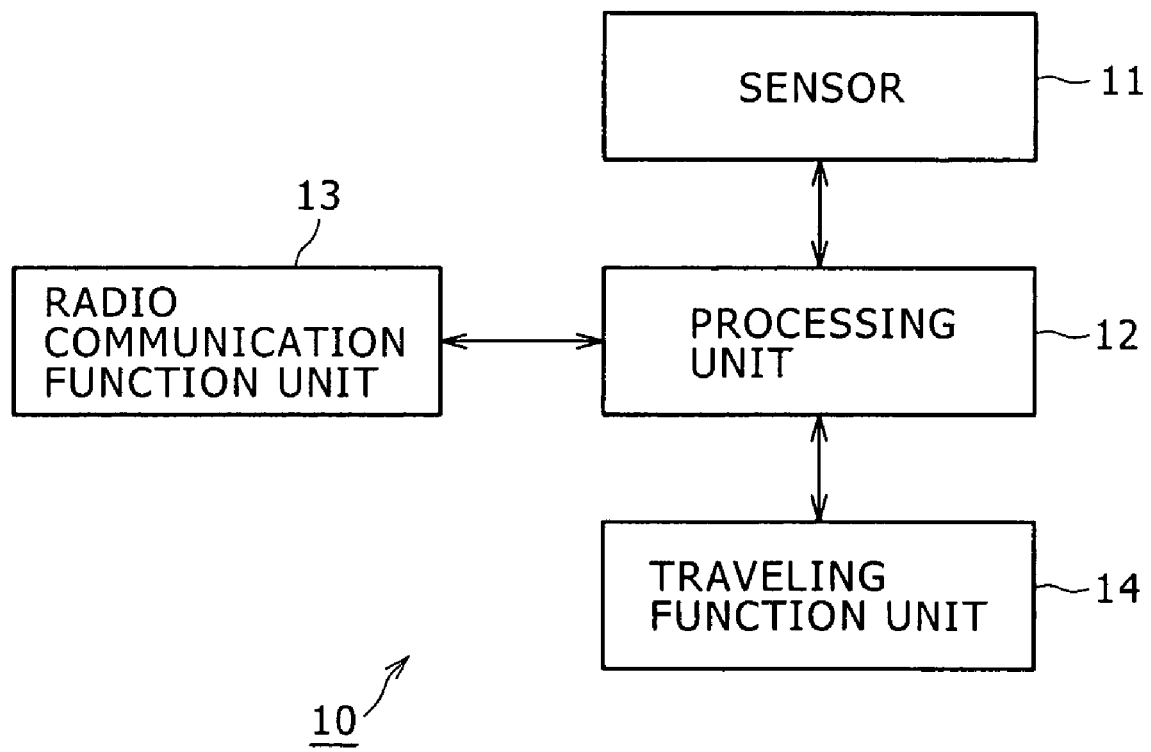
FIG. 1 is a view schematically showing configuration of a device which can operate as a sensor node on a sensor network according to the present invention.

FIG. 1 schematically shows a device capable of operating as a sensor node on a sensor network according to the present invention. A sensor node 10 shown in this figure includes a sensor 11, a processing unit 12, a radio communication unit 13, and a traveling function unit 14.

The sensor 11 includes a temperature sensor or other measuring instruments for sampling various types of environmental information.

The processing unit 12 includes a processor and a memory and provides general control over operations of the device as a whole with a processor executing a prespecified program.

The radio communication unit 13 executes radio communication with other sensor nodes according to the IEEE 802.11, Bluetooth communication, or any other communication protocol. In this embodiment, the radio communication function unit 13 forms a network ad-hoc by operating in the self-directive and dispersive state, but it is needless to say that other application is conceivable in which a specified sensor node is set as a control station or an access point for building a network. Further, within a range not interfering a traveling work by the traveling function unit 14, not only radio communication, but also wired communication may be employed.

The traveling function unit 14 includes a mechanism such as, for instance, a wheel or a movable leg. The traveling function unit 14 executes such works as a random walk according to controls by the processing unit 12. The traveling function unit 14 may have a function such as that for preventing collision or for stabilizing a posture during a traveling work, but the functions do not directly relate to a gist of the present invention, and therefore descriptions thereof are omitted herefrom.

Figure 2:
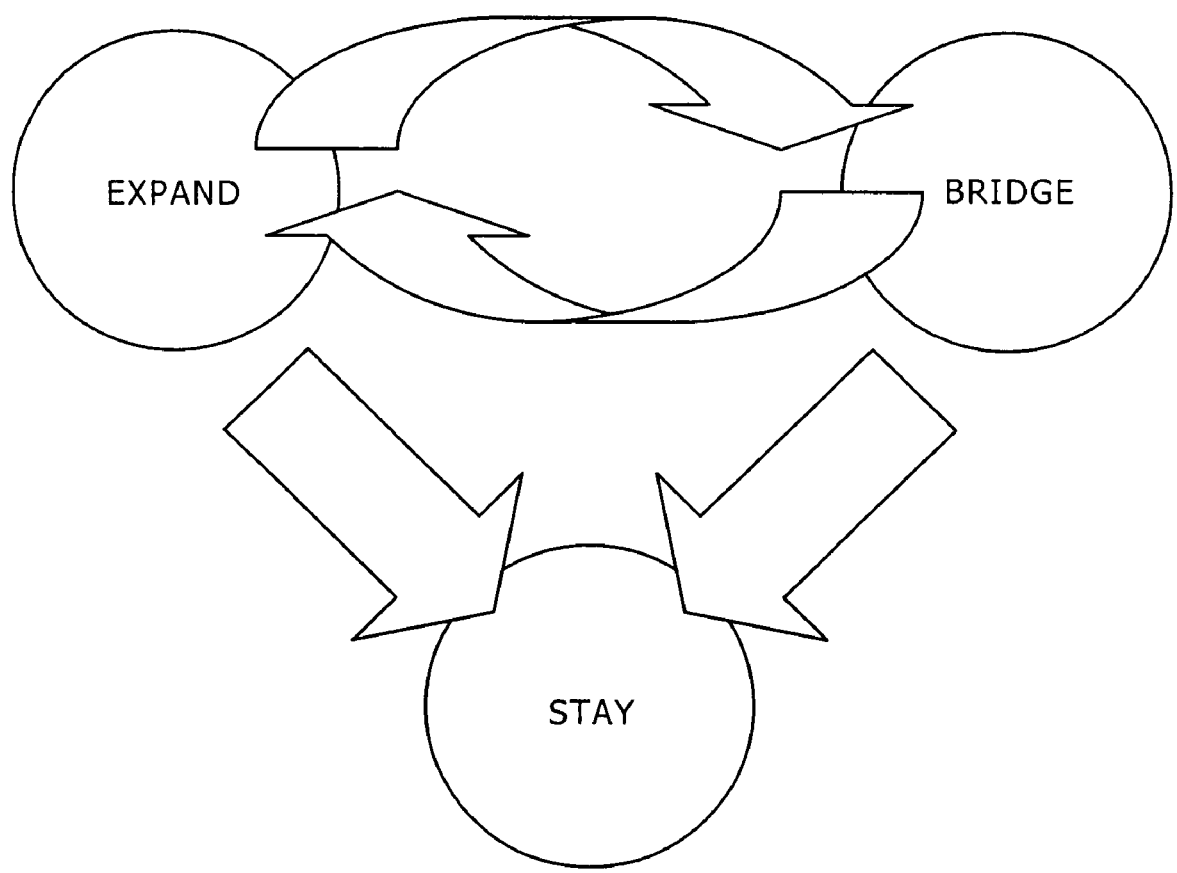
FIG. 2 is a view showing transition of operating state in the sensor node.

FIG. 2 shows transition of operating state in a sensor node. As shown in the figure, three types of states of "Expand", "Bridge", and "Stay" are defined in each sensor node. Each sensor node not utilizing positional information travels and exchanges information with neighboring nodes within a coverage of electric wave, and dynamically switches a role thereof between expansion of a topology and connection of local topologies. With this feature, a topology expands in association with a self-directive travel of each sensor node having a traveling function.

A node travels with the traveling function in both of the Expand state and Bridge state. There is not specific restriction over a method of traveling, but in the descriptions of this embodiment, it is assumed that each node performs a random walk freely changing a traveling direction. A node in the Expand state has a role of expanding a topology functioning as a core. A node in the Bridge state has a role of forming a topology functioning as a core. In an area where nodes are provided at a high density, the nodes are, for instance, set in the Expand state and Bridge state according to a prespecified proportion, and expansion of a topology and connection of local topologies are performed according to cooperative operations of the nodes.

In contrast, a node in the Stay state is a component of the network topology, and does not travel.

Every node starts operating in the Expand state. Then, in an area where nodes are present at a high density, the nodes are set in the Expand and Bridge stats according to a prespecified proportion, and expansion of a topology and connection of local topologies are performed by the nodes operating in the cooperative mode. Then the nodes finally shift to the Stay state respectively, thus a network topology being formed gradually.

Further each node exchanges information with neighboring nodes by transmitting a kind of report signal referred to as HELLO message. For instance, a node boots a round timer, and executes message exchange periodically. FIG. 3 shows an example of configuration of a HELLO message. In the example shown in the figure, the HELLO message describes neighboring node information including a node ID identifying the node itself, a State indicating a current state of the node, and a node ID list for neighboring nodes (which can receive the HELLO message). Each node can exchange information with neighboring nodes by transmitting the HELLO message.

Each node determines, by using information described in the HELLO messages received from the neighboring nodes, whether an operating state of the node should be shifted or not. More specifically, each node can compute the density in an area in which the node itself is now present according to the HELLO message. In an area where nodes are present at a high density, the nodes are set in the Expand state and Bridge state according to a prespecified proportion, and expansion of a topology and connection of local topologies are performed by nodes operating in the cooperative state.

A node in the Expand state has a role for expanding a topology, while a node in the Bridge state has a role of forming a topology. Then the nodes in the Expand state and Bridge state gradually shift to the Stay state in response to generation of a prespecified event to stop random walking, thus the nodes being incorporated in a network topology. For instance, a node in the Expand state shifts to the Stay state, when the node is connected only to one neighboring node in the Stay state, to become a component of the topology. A node in the Bridge state shifts to the Stay state, not according to a relation with neighboring nodes, but together with neighboring nodes having no common neighboring node (or having a hidden terminal respectively) to become a component of the topology.

As described above, each node dynamically switches the role between expansion of a topology and connection of local topologies, and thus all of the nodes finally shift to the Stay node, thus a network topology being formed.

State transition in a sensor node is described hereinafter.

State transition from the Expand state to Stay state:

A node in the Expand state has a role of connecting to another node in the Stay state to expand the topology. A condition for shifting from the Expand state to the Stay state is that the node is connected only one neighboring node in the Stay state. More specifically, the condition is that the node receives a HELLO message from one node in the Stay state within one round (namely, a cycle of transmitting a HELLO message).

Figure 4:
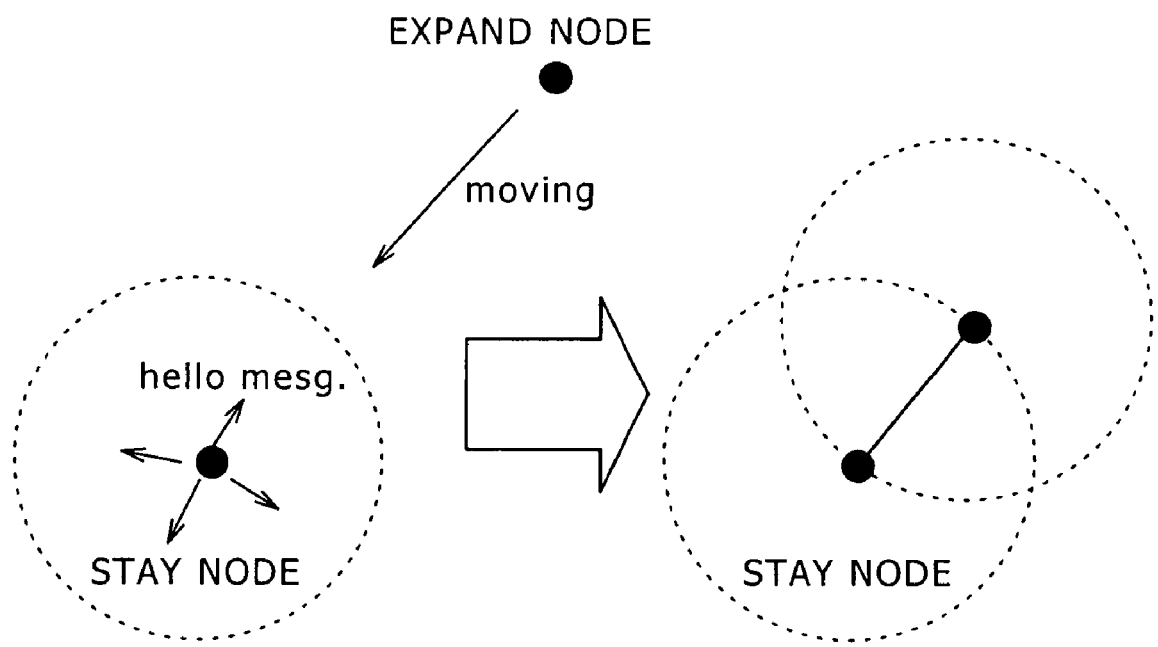
FIG. 4 is a view showing shift of an operating mode of a node from the Expand state to the Stay state.

FIG. 4 illustrates state transition of a node from the Expand state to the Stay state. In the case shown in the figure, a node in the Stay state transmits a HELLO message once in each round within a coverage of electric wave sent from the node. On the other hand, a node in the Expand state travels in a direction by means of random walking, and it is assumed in the following descriptions that the node in the Expand state enters the coverage of the node in the Stay state and receives a HELLO message. The node in the Expand state analyzes contents of the HELLO message, and detects a node ID of the neighboring node and that the node is in the Stay state. When the node in the Expand state does not receive a HELLO message only from the node in the Expand state within one round, the node in the Expand state stops random walking and shifts to the Stay state to become a component of a network topology.

When a node shifts from the Expand state to the Stay state, the node once stops traveling and transmits a Freeze message to the node in the Stay state having transmitted the HELLO message. The node in the Stay state having received the Freeze message must transmit a Freeze-ACK message. When the node in the Expand state receives the Freeze-ACK message, the nodes shifts to the Stay state.

Details of the operation sequence for state transition are described hereinafter.

State Transition from the Bridge State to Stay State:

A node in the Bridge state shifts to the Stay state when the node receives HELLO messages from two or more nodes which are independent from each other.

The expression of "nodes which are independent from each other" means that the node are not neighboring to each other, and also that the nodes do not have any common neighboring node. Namely, the nodes are not connected to each other within two hops via other node. Whether the nodes have the relation as described above or not can be determined based on a list of neighboring nodes included in the HELLO message transmitted from neighboring nodes.

Figure 5:
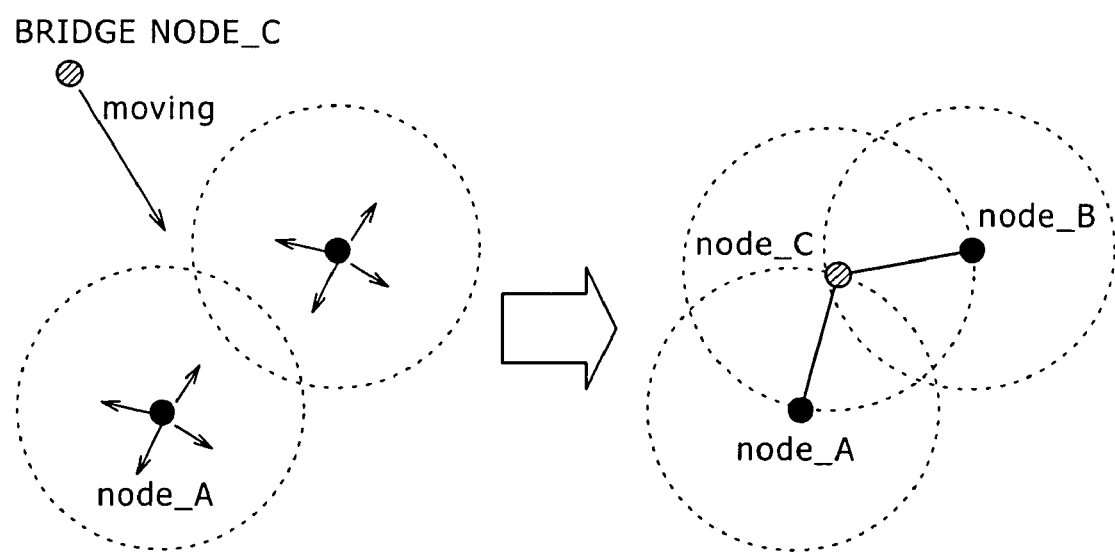
FIG. 5 is a view showing shift of an operating mode of a node from the Bridge state to the Stay state.

FIG. 5 illustrates the situation in which a node in the Bridge state shifts to the Stay state. In the case shown in the figure, two nodes A and B independent from each other (regardless of the states of the nodes) each transmit a HELLO message once in each round respectively. On the other hand, a node C in the Bridge state travels in any direction by means of random walking, and it is assumed in the following descriptions that the node C enters the coverage by the two nodes A and B and receives HELLO messages from the two nodes A and B. Then the node C in the Bridge state analyzes the HELLO messages, acquires node IDs of the neighboring nodes A and B and lists of neighboring nodes to the nodes, and detects that the two nodes are not neighboring to each other nor have any common neighboring node, namely that the two nodes are independent from each other. As understood also from the figure, the nodes A and B independent from each other are hidden terminals to each other via the node C in the Bridge state as a bridge. Then the node C in the Bridge state stops random walking and shifts to the Stay state together with the neighboring nodes A and B independent from each other to become a component of a network topology.

When a node in the Bridge state receives HELLO messages from two or more nodes independent from each other regardless of the state of each of the nodes, the node in the Bridge state stops traveling, and transmits a Freeze message to each of the neighboring nodes to the nodes above. When the node in the Bridge state receives Freeze-ACK messages from two or more nodes, the node in the Bridge state shifts to the Stay state. Further when a node in a state other than the Stay state receives the Freeze message, the node shifts to the Stay state. Details of operation sequence for state transition are described hereinafter.

Because nodes not in the Stay state are traveling, a Freeze-ACK message is not always returned in response to a Freeze message. When the Freeze-ACK message is returned only from one node (or when the Freeze-ACK message is not returned from any node), it indicates as shown on the right side of FIG. 5 that the 2-hop connection has not been established. When any Freeze-ACK message is not returned, the node in the Bridge state then transmits a Freeze-Cancel message to cancel the processing by the node having shifted to the Stay state in response to the Freeze message, and the node itself returns to the Bridge state and continues random walking. When a Freeze-Cancel message is received, the node cancels shift to the Stay state and returns to the previous state (Expand state or Bridge state).

Mutual State Transition Between the Expand State and Bridge State:

When a sensor network is initialized, all nodes are in the Expand state. When there is no node in the Stay state, a node in the Expand state never shifts to the Stay state, and therefore the node continues traveling everlastingly. To prevent occurrence of the situation as described above, the state transition from the Expand state to the Stay state and that in the reverse direction occurs according to prespecified conditions.

A node in the Bridge state can start formation of a topology. Therefore, with only nodes each in the Bridge state, when the nodes are present at remote cites respectively, there is the possibility that a network is finally formed in patches. To overcome this problem, in this embodiment, by introducing a mechanism for generating nodes in the Bridge state in an area where a density of nodes is higher than a prespecified level, the probability of connection of all nodes to a network, namely the probability of formation of a single connection network is raised.

More specifically, each node computes the number of neighboring nodes utilizing information described in HELLO messages received from neighboring nodes. Then the node computes a weighted average of the numbers to preserve the node density at the computed value. When the value is higher than a prespecified value, namely when a node is continuously traveling in an area with a high node density, the node shifts to the Bridge state according to the preset probability. The operation sequence for computing a node density and dynamically switching the node state between the Expand state and Bridge state based on a result of computing is shown below with a format of simulated program code. In the following description, n (t) indicates the number of neighboring nodes to which a HELLO message is to be transmitted in the t-th round. Dens (t) indicates a node density detected in the round t, which is computed from a node density just ahead and the number of current neighboring nodes. For instance, the computational expression for node density of $dens(t)=\beta \, dens(t-1)+(1-\beta)n(t)$ is applied. (Note that $\beta$ is larger than zero and smaller than 1 ($0<\beta<1$) and the recommended value is 0.8).

$$\rho = \text{random}( ) // 0 < \rho < 1$$

if $(dens(t)>K)$ && $(\rho<1/n(t))$ {//K:static value, recom. 4 Set state to "Bridge"} else {Set state to "Expand"}

Figure 6:
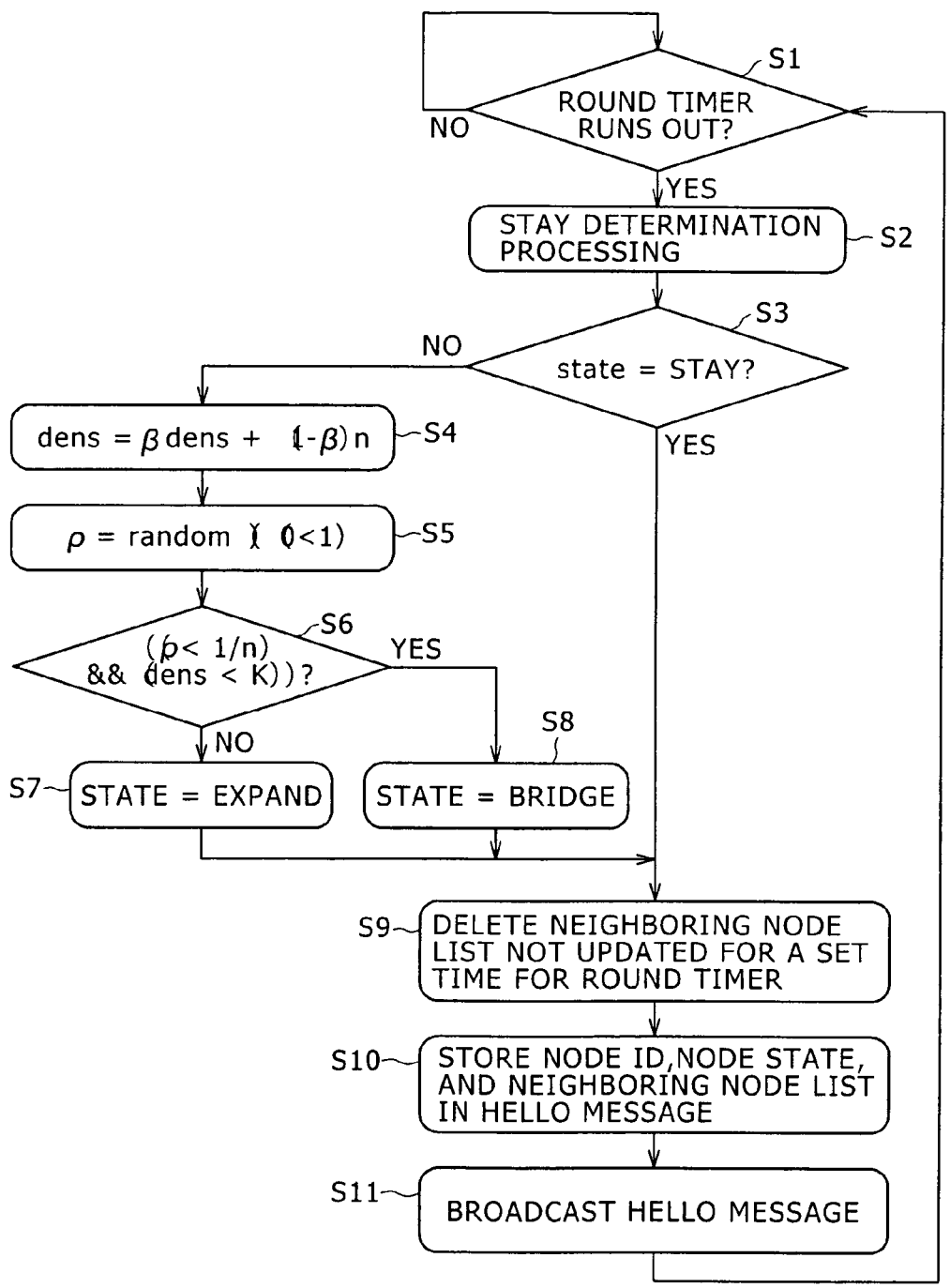
FIG. 6 is a flow chart showing the processing sequence executed by a node for transmission of a HELLO message and state transition.

FIG. 6 shows a processing sequence executed by a node to transmit a HELLO message and execute state transition with a flow chart format. It is assumed herein that each node uses the following parameters for management of global information and information for each neighboring node.

Global Information
   state//node state
   node neighbor[n]//neighboring node list
   dens//average number of neighboring nodes Information for Each Neighboring Node:
   nbor.state//node state
   nbor.neighbor[n]//neighboring node list
   nbor.tstamp//updating of time When a round timer runs out (step S1), at first the processing for determination of the Stay state is executed (step S2).

When it is determined in step S2 that the sensor node is not in the Stay state (step S3), the current node density dens (t) is computed by summing up HELLO messages received from neighboring nodes (step S4), and also a random number $\rho$ is generated (step S5). When the node density dens(t) is less than a prespecified value K (step S6), the sensor node is kept in the Expand state effected in initialization (step S7).

On the other hand, when the node density dens(t) is over the prespecified value K (step S6), the sensor node is dynamically switched between the Expand state and Bridge state according to the probability obtained according to the random number $\rho$ (step 8).

When the sensor node is in the Stay state, or after a state is decided in step S7 or in step S8, the list of neighboring nodes not updated yet are deleted, when the time is over that set in the round timer (step S9).

Then, the node generates a HELLO message including a node ID thereof, the determined or decided node state, and a list of neighboring nodes and stores the data once in a transmission buffer (in the step S10), and transmits the HELLO message in the broadcasting mode (step S11).

Then the processing sequence returns to step S1, and the processing sequence as described above is started each time the round timer runs out.

Figure 7:
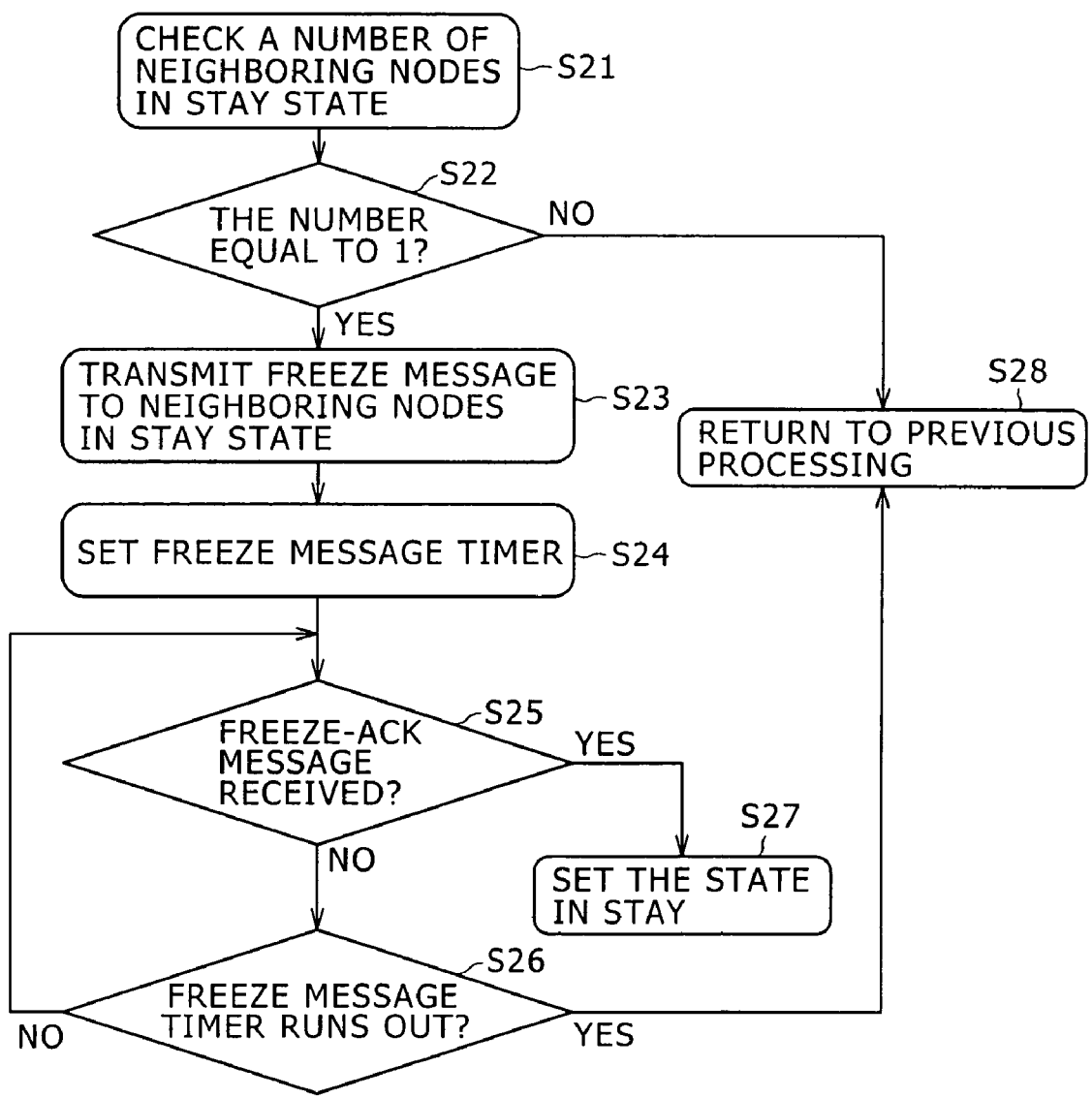
FIG. 7 is a flow chart showing a processing sequence execution by a sensor node in the Expand state for state determination.

FIG. 7 shows a processing sequence executed by a sensor node in the Expand state to determine a state of the node in step S2 shown in FIG. 6 with a flow chart format. As described above, the sensor node in the Expand state shifts to the Stay state when the node is connected to one neighboring node in the Stay state.

Firstly, the sensor node counts HELLO messages received from neighboring nodes to check the number of the neighboring nodes in the Stay state (step S21).

When the number of the neighboring nodes in the Stay state is not 1 (step S22), the processing sequence returns to the previous step (step S28), and no shift of the state is executed.

On the other hand, when the number of the neighboring nodes in the Stay state is 1 (step S22), the sensor node sends a Freeze message to the neighboring nodes (step S23) and sets a Freeze message timer (step S24).

In this step, if the sensor node can receive a Freeze-ACK message before the Freeze message timer runs out (step S25), the sensor node sets the state thereof to the Stay state (step S27).

In the meantime, if the sensor node can not receive a Freeze-ACK message before the Freeze message timer runs out (step S26), the processing sequence returns to the previous step (step S28), and no shift of the state is executed.

Figure 8:
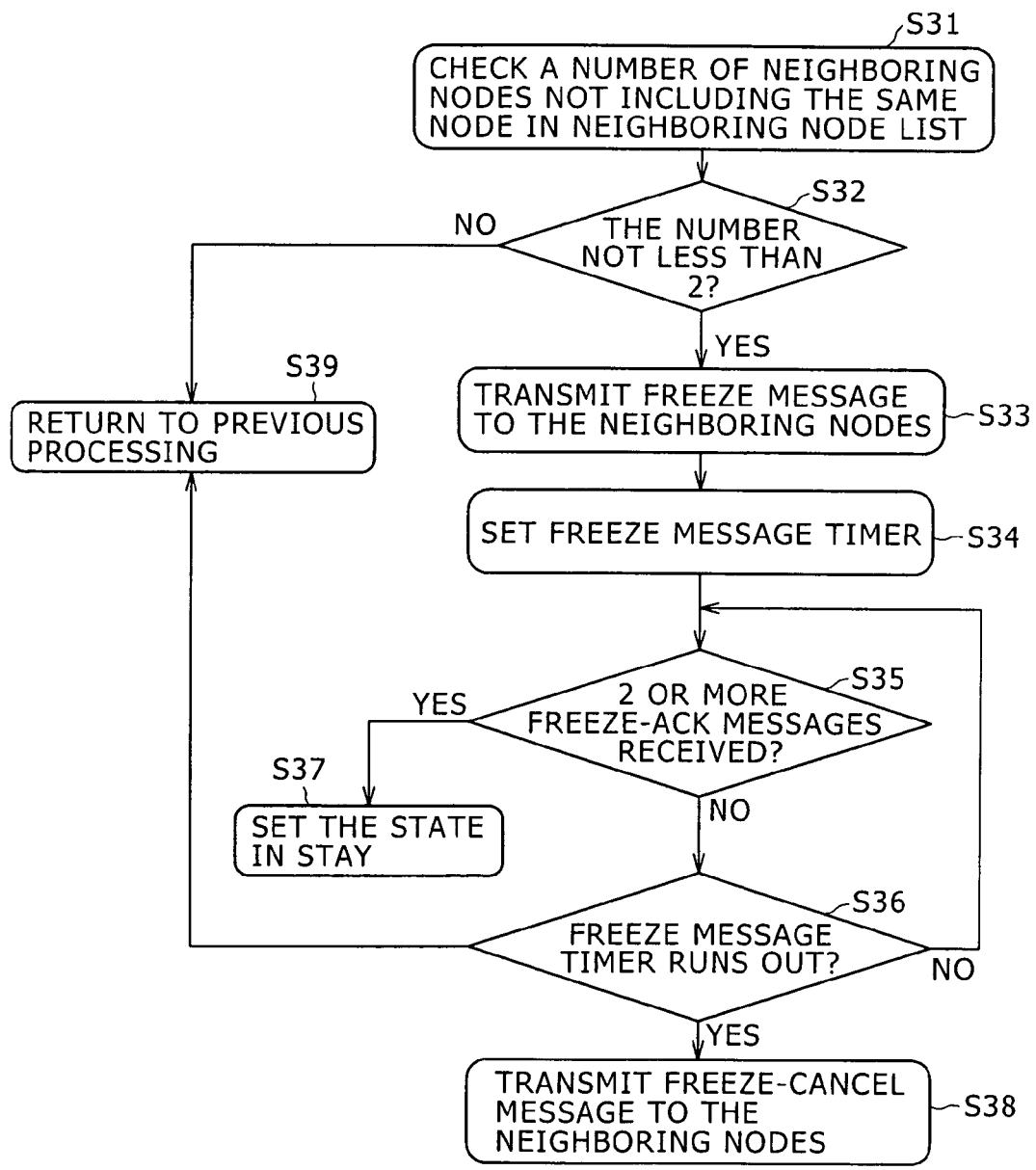
FIG. 8 is a flow chart showing a processing sequence executed by a sensor node in the Bridge state for state determination.

FIG. 8 shows a processing sequence executed by a sensor node in the Bridge state for state determination in step S2 in FIG. 6 with a flow chart format. As already described above, a sensor node in the Bridge state shifts to the Stay state under the condition the sensor node can be connected to two or more nodes which are not neighboring to each other nor have any common neighboring node.

Firstly, a sensor node counts the number of the neighboring nodes each of which does not include a common node in a neighboring node list, namely, the number of neighboring nodes each of which are independent from each other (step S31).

In this step, when the number of neighboring nodes is less than 2, the processing sequence returns to the previous step (step S39), and no shift of the state is executed.

On the other hand, when the number of neighboring nodes each of which are independent from each other is not less than 2 (step S32), the sensor node sends a Freeze message to these neighboring nodes (step S33) and sets a Freeze message timer (step S34).

Herein, if the sensor node can receive a Freeze-ACK message from each of every neighboring node to which the sensor node has sent the Freeze message timer before the Freeze message timer runs out (step S35), the sensor node sets the state thereof to the Stay state (step S37).

In the meantime, if the sensor node can not receive a Freeze-ACK message from each of every neighboring node to which the sensor node has sent the Freeze message timer before the Freeze message timer runs out (step S36), the sensor node itself cancels a shift of the Stay state thereof and also resends a Freeze-Cancel message to the neighboring nodes (step S38). Then the processing sequence returns to the previous step (step S39), and no shift of the state is executed.

Figure 9:
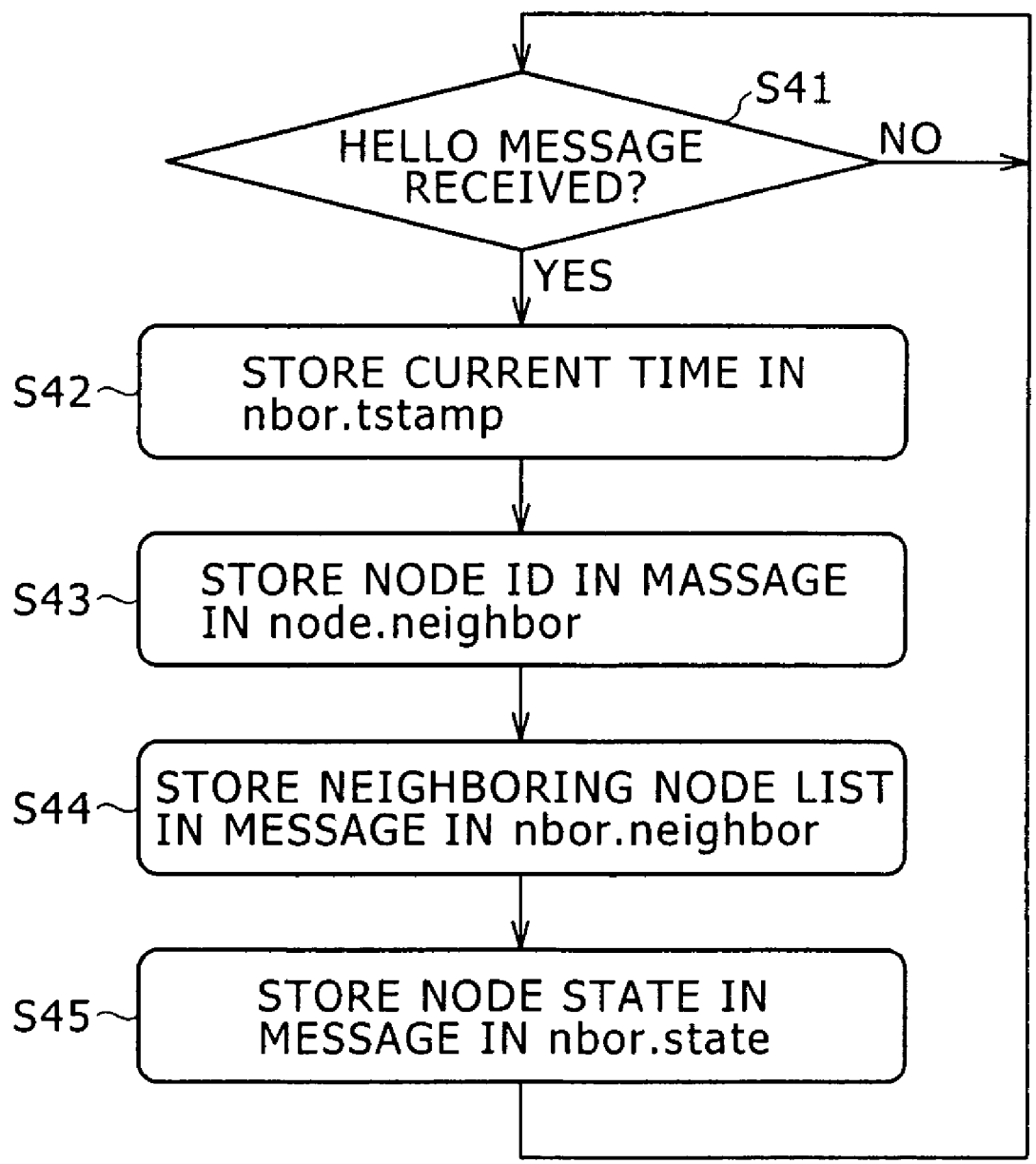
FIG. 9 is a flow chart showing a processing sequence executed by a node when the node received a HELLO message from an neighboring node.

FIG. 9 shows a processing sequence when a sensor node receives a HELLO message from the neighboring nodes with a flow chart format.

When a sensor node receives a HELLO message from the neighboring nodes (step S41), the sensor node analyzes contents of the HELLO message.

The sensor node then stores the current time in the parameter of nbor. tstamp (step S42).

Next the sensor node stores a node ID described in the HELLO message in the parameter of node. neighbor (step S43).

Next the sensor node stores a neighboring node list described in the HELLO message in the parameter of nbor. neighbor (step S44).

Next the sensor node stores a node state described in the HELLO message in the parameter of nbor. state (step S45).

Figure 10:
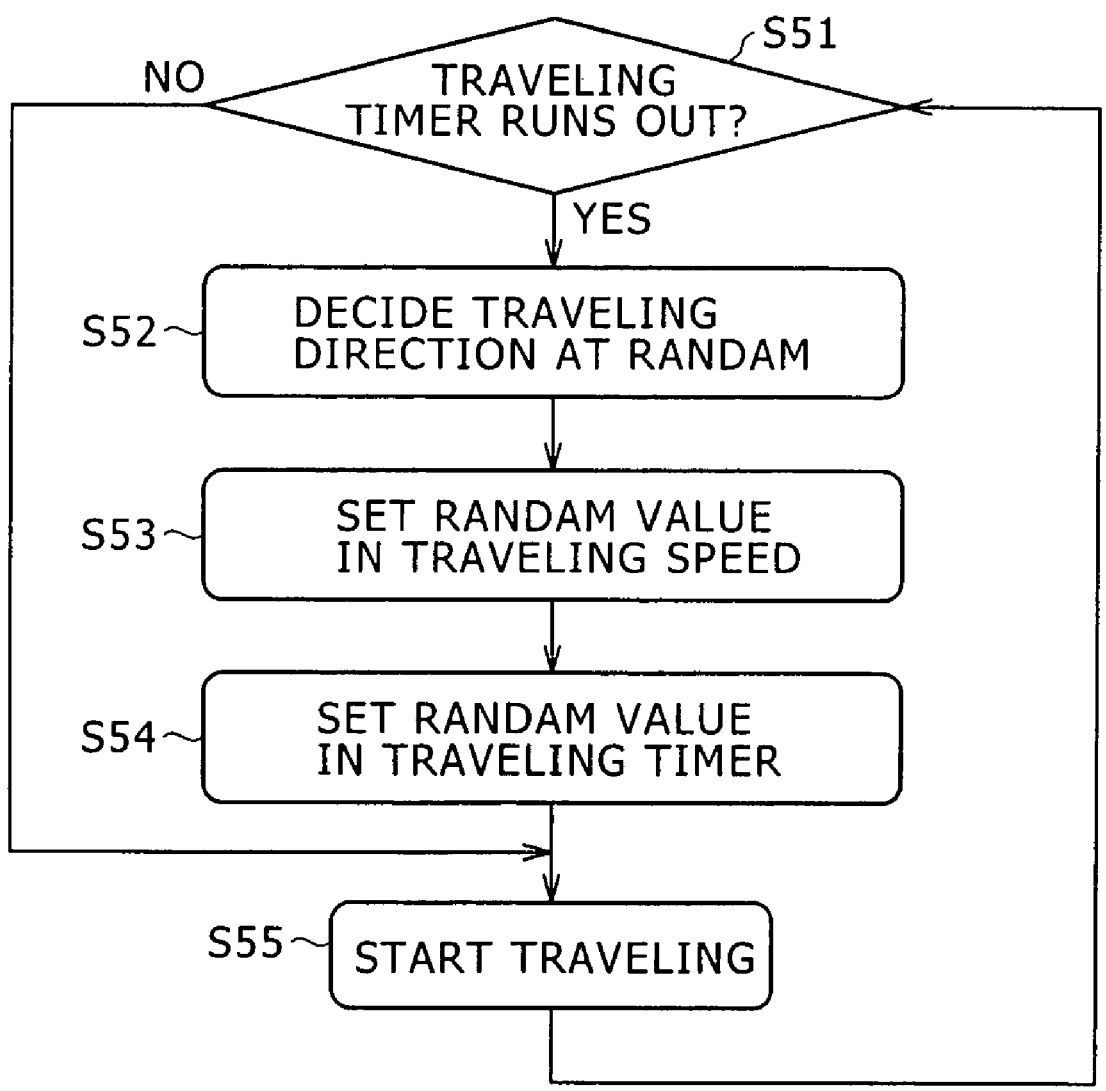
FIG. 10 is a flow chart showing a processing sequence executed by a node in the Expand state or Bridge state for a random walk with the traveling function.

FIG. 10 shows a processing sequence executed by a node in the Expand state or Bridge state for a random walk with the traveling function with a flow chart format.

A sensor node in the Expand state and the Bridge state sets a traveling timer, and, when the traveling timer times out (step S51), the sensor node determines a traveling direction thereof at random (step S52).

Then the sensor node sets a random value for a traveling speed thereof (step S53) and sets a random value for the traveling timer (step S54) to start traveling (step S55).

As described above, the sensor network system according to the present invention aims to maximize the network topology while keeping the connectivity between sensor nodes. Each of the nodes reversibly shifts the state thereof between the Expand state in which a node searches for a position allowing to obtain connectivity with the neighboring nodes for expanding a network topology and the Bridge state in which a node searches for a position allowing to obtain connectivity with the neighboring nodes for connecting between independent local network topologies while the node is traveling around. A node in the Expand state shifts to the Stay state when the node can be connected to a node neighboring thereto in the Stay state, while a node in the Bridge state shifts to the Stay state when the node can be connected to two or more nodes which are not neighboring to each other and do not have any common neighboring node.

Namely, each node dynamically switches a role thereof between expansion of a topology and connection of local topologies, and searches, while traveling by means of a random walk, for a state where all nodes can be connected by a communication procedure such as multihop, namely a suitable position for forming a single connected network to finally shift to the Stay node.

However, two types of performance degradation shown below may occur in the basic mechanism for forming a network topology.

For instance, as shown in FIG. 11, when two nodes in the Expand state are traveling in substantially the same direction and have connectivity with a node in the Stay state, as soon as a first node in the Expand state connects to any node in the Stay state, a second node in the Expand state connects to the first node just shifted to the Stay state. Thus the two nodes neighboring to each other shift to the Stay state. This is not advantageous from the view point of maximizing a topology area.

Figure 12:
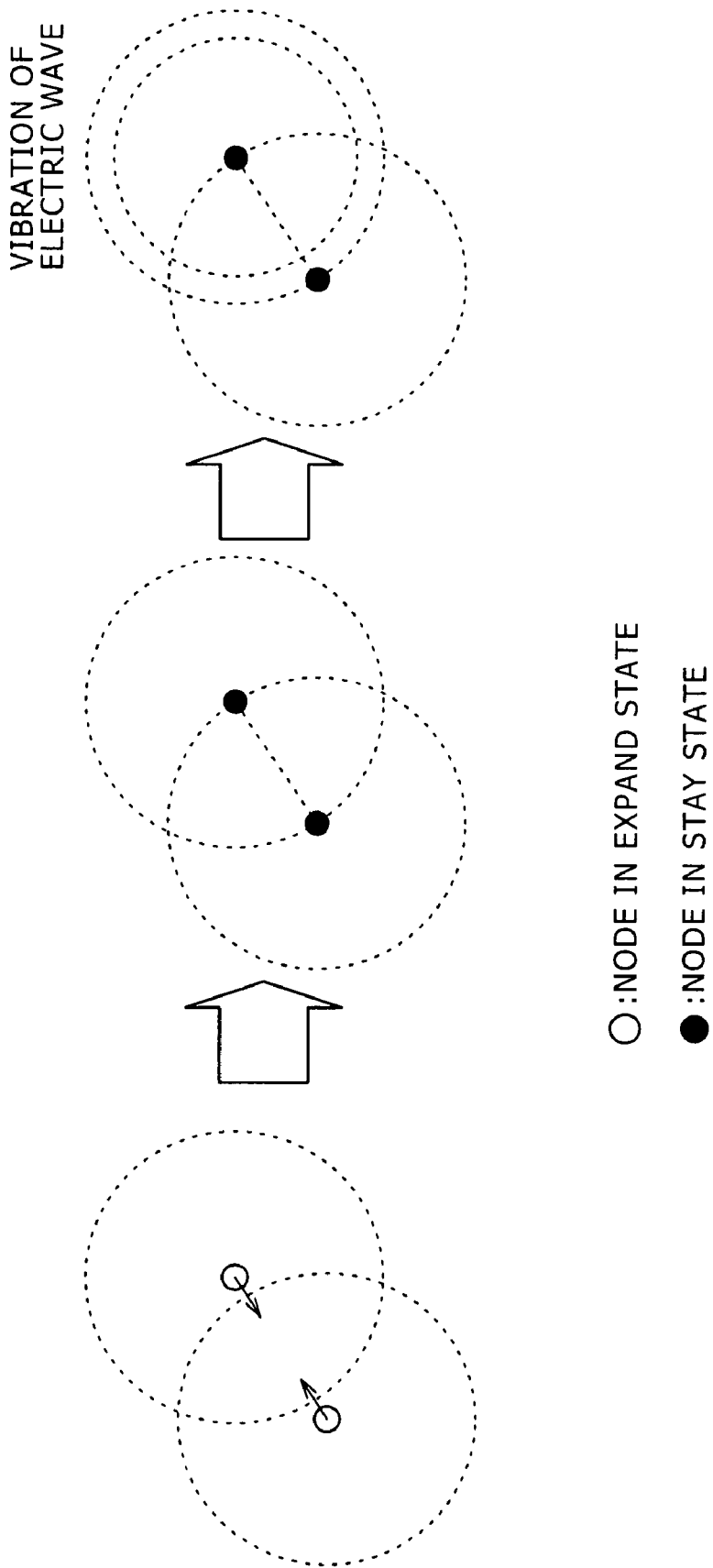
FIG. 12 is a view for illustrating the situation in which a performance for expanding a topology has been degraded in a basic mechanism of a network topology.

Further, as shown in FIG. 12, the situation may occur in which, when two nodes shift to the Stay state, the shift to the Stay state takes place on the margin of coverage of electric wave. Radio electric wave is well known to vibrate. In a case above, especially when a node is distant from an electric wave emitter, connectivity may be interrupted, so that it is desirable to avoid connectivity on the margin of coverage of electric wave in forming a topology.

To solve the two problems described above, the present embodiment provides an improved method utilizing amplitude of electric wave. In other words, each sensor node obtains connectivity with neighboring nodes from which electric wave with appropriate amplitude can be obtained in a radio communication function unit therein. More specifically, neighboring nodes from which electric wave with an amplitude higher or lower than a prespecified value is received are regarded as undesirable ones for connection, and connection with the nodes is avoided.

A number of radio communication devices can mutually obtain amplitude of electric wave from the other radio communication devices by means of the peer to peer communication. For instance, beacon information data transmitted every 100 millisecond is used in IEEE 802.11 to know the amplitude of electric wave.

A mathematical model has been proposed for representing a relation between amplitude of electric wave and a distance. (See, for instance, "RADAR: An In-Building RF-Based User Location and Tracking System", P. Bahl and V. Padmanabhan (In Proceedings of the IEEE Infocom, March 2000)). In the present embodiment, this model is used for realizing connectivity with optimal amplitude of electric wave.

Figure 13:
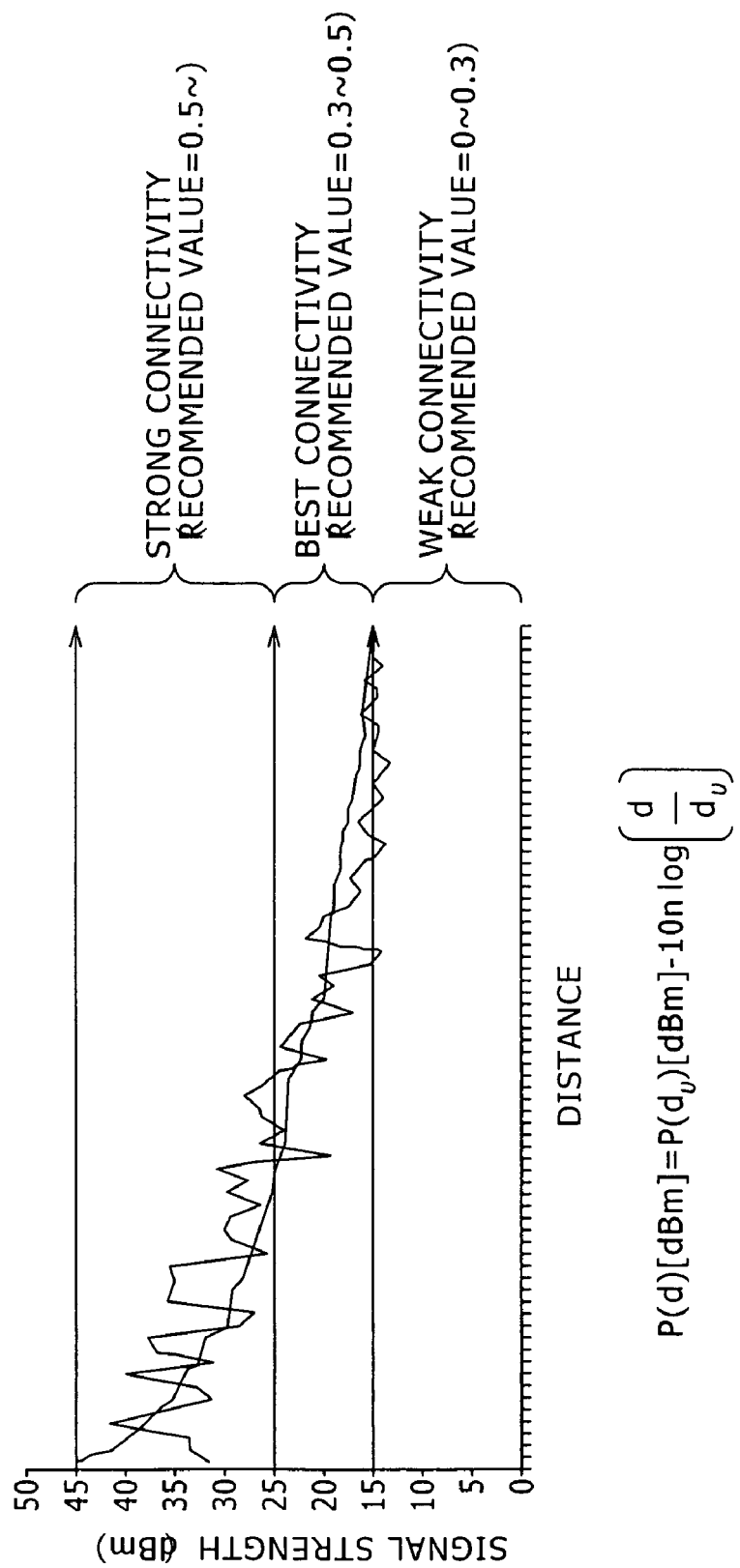
FIG. 13 is a view for illustrating a method of obtaining an optimal amplitude of electric wave with a mathematical model based on a relation between amplitude of electric wave and a distance.
Figure 14:
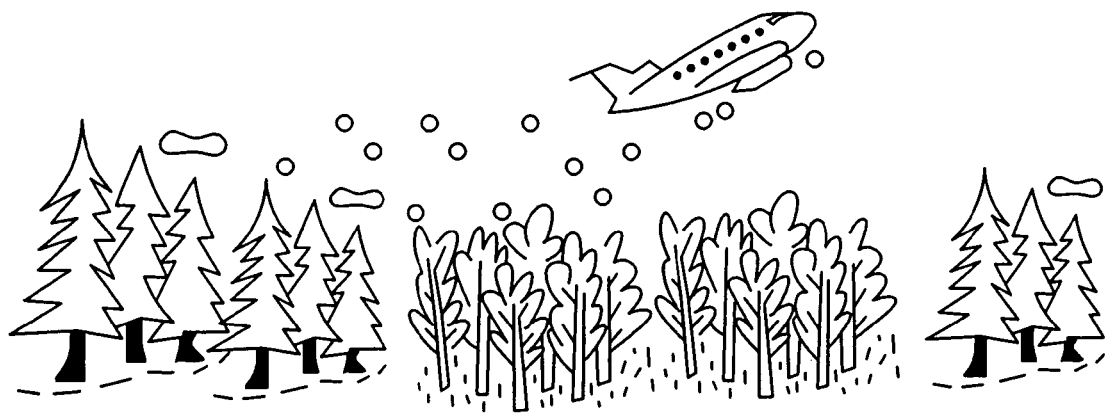
FIG. 14 is a view showing a situation in which a sensor network is formed by scattering tens of thousands of inexpensive and minute sensor nodes from a flying airplane.

FIG. 13 illustrates a method of obtaining optimal amplitude of electric wave with a mathematical model based on a relation between amplitude of electric wave and a distance. An example shown in the figure assumes a case in which a neighboring node allowing to obtain an amplitude of electric wave of about 0.3 to 0.5 as compared to the maximum amplitude of electric wave is optimal connectivity (BEST connectivity). For instance, a node in the Expand state shifts a state thereof to the Stay state, when the node can obtain BEST connectivity with only one neighboring node in the Stay state. In the meantime, a node in the Bridge state shifts a state thereof to the Stay state, when the node can obtain BEST connectivity with two or more nodes which are not neighboring to each other and do not have any common neighboring node.

On the other hand, when a node can obtain amplitude of electric wave more than 0.5 compared to the maximum amplitude of electric wave (strong connectivity) from a candidate node, connectivity with such a node is avoided, because the two nodes may be close to each other and both may shift to the Stay state.

Further, when a node can obtain from amplitude of electric wave less than 0.3 compared to the maximum amplitude of electric wave (weak connectivity) a candidate node, connectivity with such a node is avoided, because connectivity may be interrupted.

The present invention is described above in detail with reference to a specific embodiment. It is obvious, however, that modifications and substitutions of the embodiment can be made by those skilled in the art without departing from the gist of the present invention.

Although the sensor network including each communication node having a sensor respectively is described as an example in the present invention, the gist of the present invention is not limited to the example. For instance, by applying in the present invention to ad hoc network system in which each sensor node having a traveling function operates in the self-directive state, the expansion or the optimization of a topology area can be achieved.

Although description of the present specification takes an ad hoc network system as an example in which each sensor node operates in the self-directive and dispersive state, the present invention is not limited to the example, and an application thereof is also possible in which a network is built by setting a specific sensor node as a control station or an access point.

In brief, the present invention is disclosed by taking an example, and the contents of description in the present specification should not be interpreted in a limited manner. To determine the gist of the present invention, the scope of claims should be referred to.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A network system for forming a network topology with a plurality of nodes each having a radio communication function and a traveling function and operating in a self-directive and dispersive state,
   wherein each node has first and second states in which the node travels with said traveling function and searches for information for connectivity with neighboring nodes and a third state in which travel with said traveling function is stopped, and a node in the first state shifts to said third state when a first condition is satisfied and a node in the second state shifts to the third state when a second condition different from said first condition is satisfied, and
   each node finally shifts to said third state dynamically switching between said first state and said second state to form a network topology,
   wherein said node has a sensor, and said first state is an Expand state in which the node travels and searches for a position where connectivity with neighboring nodes is obtained to expand a network topology; said second state is a Bridge state where the node travels and searches for a position where connectivity with neighboring nodes is obtained to connect independent local topologies; and said third state is a Stay state where the node stops at the current position to become a component of the network topology,
   wherein a node in the Expand state shifts to the Stay state under the first condition under which the node can be connected to an neighboring node in the Stay state, and
   wherein a node in the Expand state transmits a second signal to said connectable neighboring nodes in the Stay state and shifts to the Stay state upon reception of a third signal.

2. The network system according to claim 1,
   wherein a node in the Bridge state shifts to the Stay state under a second condition where the node can be connected to two or more independent nodes not neighboring to each other and not having any common neighboring node.

3. The network system according to claim 1,
   wherein all nodes are in the Expand state in the initial stage of a network topology and nodes in the Bridge state are generated according to prespecified probability when the node density is over a prespecified value.

4. The network system according to claim 1,
   wherein each node transmits a first signal including a list of nodes neighboring to the node at a prespecified timing, and recognizes connectable neighboring node or a node density by receiving the first signal from the neighboring nodes.

5. The network system according to claim 1,
   wherein a node having received a second signal cancels transition to the Stay state when the third signal is not received within a prespecified period of time, and again transmits a fourth signal.

6. The network system according to claim 5,
   wherein a node in a state other than the Stay state shifts to the Stay state when the second signal is received, and cancels transition to the Stay state when the fourth signal is received.

7. The network system according to claim 1,
   wherein each node acquires connectivity to neighboring nodes from which electric wave with proper amplitude is received by said radio communication function.

8. The network system according to claim 7,
   wherein each node recognizes, as improper, neighboring nodes from which electric wave with amplitude higher than a prespecified value and neighboring node from which electric wave with amplitude lower than a prespecified node and avoids connection to the nodes.

9. A radio communication device operating as a sensor node in a sensor network and comprising:
   a sensor for acquiring desired information at a current position;

a radio communication function unit for executing communication with neighboring sensor nodes;

a traveling function unit for moving a position of said device; and a control unit for processing information acquired by said sensor and controlling operations of each of said function units, wherein said control unit dynamically switches an operating state of said sensor node, based on information on connectivity to neighboring nodes acquired by said radio communication function unit, between first and second states in each of which said radio communication device travels and searches for information on connectivity to neighboring nodes, shifts the operating state of said sensor node to a third state in which traveling with said traveling function unit is stopped when a first condition is satisfied in said first state, and further shifts to said third state when a second condition different from said first condition is satisfied in said second state, wherein said first state is an Expand state in which each node travels and searches for a position at which connectivity to neighboring node is obtained for expanding a network topology; said second state is an Bridge state in which each node travels and searches for a position at which connectivity with neighboring nodes is obtained for connecting independent network topologies to each other; and said third state is a Stay state in which each node stops at a current position and becomes a component of a network topology, wherein said control unit shifts an operating state of each node in the Expand state to the Stay state under a first condition under which the node can be connected to one neighboring node in the Stay state, and wherein said control unit transmits in the Expand state a second signal to said connectable neighboring nodes in the Stay state and shifts an operating state of each connectable neighboring nodes to the Stay state upon reception of a third signal.

10. The radio communication device according to claim 9, wherein said control unit shifts an operating state of each node in the Bridge state to the Stay state under a second condition under which the node can be connected to two or mode independent nodes not neighboring to each other and not having any common neighboring node.

11. The radio communication device according to claim 10, wherein said control section transmits in the Bridge state a second signal to each of the nodes independent from each other and shifts an operating state of each of the nodes to the Stay state upon reception of a third signal.

12. The radio communication device according to claim 11, wherein said control section cancels shift to the Stay state when the third signal is not received within a prespecified period of time after transmission of the second signal, and again transmits a fourth signal.

13. The radio communication device according to claim 12, wherein said control unit shifts, in a state other than the Stay state, an operating state of each node to the Stay state upon reception of the second signal, and cancels shifts to the Stay state upon reception of the fourth signal.

14. The radio communication device according to claim 9, wherein said control unit sets an operating state of each node to the Expand state in the initial state, and shifts the operating state of each node to the Bridge state according to prespecified probability when it is detected based on information concerning connectivity with neighboring nodes acquired by said radio communication function unit that the node density is over a prespecified value.

15. The radio communication device according to claim 9, wherein said control unit generates a first signal including a list of nodes neighboring to the unit in the current state and transmits the first signal at a prespecified timing from said radio communication function unit; and further said control unit recognizes connectable neighboring node or the node density by processing the first signal received by said radio communication function section.

16. The radio communication unit according to claim 9, wherein said control section acquires connectivity with neighboring node from which electric wave with proper amplitude can be obtained by said radio communication function unit.

17. The radio communication device according to claim 16, wherein said control section recognizes, as improper, neighboring nodes from which electric wave with amplitude higher than a prespecified value by said radio communication function unit and neighboring nodes from which electric wave with amplitude lower than the prespecified value, and avoids connectivity to the nodes.

18. A radio communication method enabling a radio communication device having a sensor, a radio communication function and a traveling function to operate as a sensor node in a sensor network, said method comprising the steps of:

dynamically switching, based on information on connectivity to neighboring nodes acquired by said radio communication function, between the first and second states in each of which each node travels with said traveling function and searches for information on connectivity with neighboring node;

shifting from the first state to the third state in which traveling with said traveling function is stopped when a first condition is satisfied; and shifting from the second state to the third state in which when the second state different from the first condition is satisfied, wherein said first state is an Expand state in which each node travels and searches for a position at which connectivity to neighboring node is obtained for expanding a network topology; said second state is an Bridge state in which each node travels and searches for a position at which connectivity with neighboring nodes is obtained for connecting independent network topologies to each other; and said third state is a Stay state in which each node stops at a current position and becomes a component of a network topology, wherein said control unit shifts an operating state of each node in the Expand state to the Stay state under a first condition under which the node can be connected to one neighboring node in the Stay state, and wherein said control unit transmits in the Expand state a second signal to said connectable neighboring nodes in the Stay state and shifts an operating state of each connectable neighboring nodes to the Stay state upon reception of a third signal.

19. A computer program readable medium embodied with a computer program and enabling a radio communication device having a sensor, a radio communication function and a traveling function to operate as a sensor node in a sensor network, said computer program enabling execution of the radio communication method comprising the steps of:

dynamically switching, based on information on connectivity to neighboring nodes acquired by said radio communication function, between the first and second states in each of which each node travels with said traveling function and searches for information on connectivity with neighboring node;

shifting from the first state to the third state in which traveling with said traveling function is stopped when a first condition is satisfied; and shifting from the second state to the third state in which when the second state different from the first condition is satisfied wherein said first state is an Expand state in which each node travels and searches for a position at which connectivity to neighboring node is obtained for expanding a network topology; said second state is an Bridge state in which each node travels and searches for a position at which connectivity with neighboring nodes is obtained for connecting independent network topologies to each other; and said third state is a Stay state in which each node stops at a current position and becomes a component of a network topology, wherein said control unit shifts an operating state of each node in the Expand state to the Stay state under a first condition under which the node can be connected to one neighboring node in the Stay state, and wherein said control unit transmits in the Expand state a second signal to said connectable neighboring nodes in the Stay state and shifts an operating state of each connectable neighboring nodes to the Stay state upon reception of a third signal.

20. A network system for forming a network topology with a plurality of nodes each having a radio communication function and a traveling function and operating in a self-directive and dispersive state, wherein each node has first and second states in which the node travels with said traveling function and searches for information for connectivity with neighboring nodes and a third state in which travel with said traveling function is stopped, and a node in the first state shifts to said third state when a first condition is satisfied and a node in the second state shifts to the third state when a second condition different from said first condition is satisfied, and each node finally shifts to said third state dynamically switching between said first state and said second state to form a network topology, wherein said node has a sensor, and first state is an Expand state in which the node travels and searches for a position where connectivity with neighboring nodes is obtained to expand a network topology; said second state is a Bridge state where the node travels and searches for a position where connectivity with neighboring nodes is obtained to connect independent local topologies; and said third state is a Stay state where the node stops at the current position to become a component of the network topology, wherein a node in the Bridge state shifts to the Stay state under a second condition where the node can be connected to two or more independent nodes not neighboring to each other and not having any common neighboring node, and wherein a node in the Bridge state transmits a second signal to said nodes independent from each other and shifts to the Stay state upon reception of a third signal.

21. The network system according to claim 20, wherein a node having received a second signal cancels transition to the Stay state when the third signal is not received within a prespecified period of time, and again transmits a fourth signal.

22. The network system according to claim 21, wherein a node in a state other than the Stay state shifts to the Stay state when the second signal is received, and cancels transition to the Stay state when the fourth signal is received.

23. A radio communication device operating as a sensor node in a sensor network and comprising:

a sensor for acquiring desired information at a current position;

a radio communication function unit for executing communication with neighboring sensor nodes;

a traveling function unit for moving a position of said device; and a control unit for processing information acquired by said sensor and controlling operations of each of said function units, wherein said control unit dynamically switches an operating state of said sensor node, based on information on connectivity to neighboring nodes acquired by said radio communication function unit, between first and second states in each of which said radio communication device travels and searches for information on connectivity to neighboring nodes, shifts the operating state of said sensor node to a third state in which traveling with said traveling function unit is stopped when a first condition is satisfied in said first state, and further shifts to said third state when a second condition different from said first condition is satisfied in said second state, wherein said first state is an Expand state in which each node travels and searches for a position at which connectivity to neighboring node is obtained for expanding a network topology; said second state is a Bridge state in which each node travels and searches for a position at which connectivity with neighboring nodes is obtained for connecting independent network topologies to each other; and said third state is a Stay state in which each node stops at a current position and becomes a component of a network topology, wherein said control unit shifts an operating state of each node in the Bridge state to the Stay state under a second condition under which the node can be connected to two or more independent nodes not neighboring to each other and not having any common neighboring node, and wherein said control section transmits in the Bridge state a second signal to each of the nodes independent from each other and shifts an operating state of each of the nodes to the Stay state upon reception of a third signal.

24. The radio communication device according to claim 23, wherein said control section cancels shift to the Stay state when the third signal is not received within a prespecified period of time after transmission of the second signal, and again transmits a fourth signal.

25. The radio communication device according to claim 24, wherein said control unit shifts, in a state other than the Stay state, an operating state of each node to the Stay state upon reception of the second signal, and cancels shifts to the Stay state upon reception of the fourth signal.

* * * * *